United States Patent
Groh et al.

(10) Patent No.: US 10,343,602 B2
(45) Date of Patent: *Jul. 9, 2019

(54) SPATIAL AUDITORY ALERTS FOR A VEHICLE

(71) Applicant: Ford Global Technologies, LLC., Dearborn, MI (US)

(72) Inventors: Alexander Groh, Detroit, MI (US); Alan Norton, West Bloomfield, MI (US); Casey Bryan Feldman, Sunnyvale, CA (US); Prabhanjan Kadepurkar, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,226

(22) Filed: Nov. 15, 2017

(65) Prior Publication Data

US 2018/0186286 A1 Jul. 5, 2018

Related U.S. Application Data

(63) Continuation of application No. 15/397,413, filed on Jan. 3, 2017, now Pat. No. 9,896,031.

(51) Int. Cl.
*B60Q 9/00* (2006.01)
*B60R 11/02* (2006.01)
*H04S 7/00* (2006.01)

(52) U.S. Cl.
CPC .......... *B60Q 9/008* (2013.01); *B60R 11/0217* (2013.01); *H04S 7/302* (2013.01); *H04R 2499/13* (2013.01); *H04S 2400/11* (2013.01)

(58) Field of Classification Search
CPC . H04R 2499/13; B60R 11/0217; B60Q 9/008; H04S 7/302; H04S 2400/11
(Continued)

(56) References Cited

U.S. PATENT DOCUMENTS 5,450,057 A 9/1995 Watanabe
5,979,586 A 11/1999 Farmer
(Continued)

FOREIGN PATENT DOCUMENTS

DE 102008021068 10/2009
EP 2445759 5/2012

OTHER PUBLICATIONS

Spatial auditory displays: Reducing cognitive load and improving driver reaction times, Jun. 8, 2012.

*Primary Examiner* — Paul Kim
(74) *Attorney, Agent, or Firm* — David R. Stevens; Stevens Law Group

(57) ABSTRACT

A vehicle includes a plurality of sensors including exterior sensors. Vehicle signals, such as those derived from sensors, are processed to detect alertable conditions and each alertable condition is represented by a created software object. A location is associated with each software object, such as corresponding to a location of an exterior feature that gave rise to the alertable condition. The software object is updated over time according to the vehicle signals, such as by updating the location according to movement of the obstacle. The software objects are processed to drive an array of speakers effective to simulate a sound originating from the location associated with the software object. The sound generated by the speakers may be repeated chimes having a volume and period determined according to the location.

14 Claims, 8 Drawing Sheets

(58) Field of Classification Search
    USPC .......................................................... 381/86
    See application file for complete search history.

(56) References Cited

U.S. PATENT DOCUMENTS

| | | | |
|---|---|---|---|
| 6,831,572 B2 | 12/2004 | Strumolo | |
| 8,296,158 B2 | 10/2012 | Kim | |
| 8,422,693 B1 * | 4/2013 | Daily | G01C 21/3629 381/86 |
| 2015/0235645 A1 | 8/2015 | Hooks | |

* cited by examiner

SPATIAL AUDITORY ALERTS FOR A VEHICLE

RELATED APPLICATIONS

The present disclosure is part of a continuation of U.S. patent application Ser. No. 15/397,413, filed on Jan. 3, 2017, and entitled "Spatial Auditory Alerts for a Vehicle", the content of which is incorporated by reference in its entirety.

BACKGROUND

Field of the Invention

This invention relates to providing alerts to a driver of a vehicle.

Background of the Invention

Modern vehicles provide many sensors that alert a driver of conditions that require the driver's attention. For example, a blind spot detection system may warn a driver of a vehicle in the driver's blind spot. A lane detection system may warn a driver that the vehicle is drifting out of its lane. A rear cross-traffic alert may warn a driver during reversing that a vehicle or pedestrian is about to cross behind the vehicle.

With the proliferation of so many sensor systems and warnings, they can become districting to the driver. In particular, where the alerts include a visual component, the driver is required to glance at a warning indicator or screen to determine the nature of the alert.

The systems and methods disclosed herein provide an improved approach for implementing alerts that are more easily processed by a driver.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
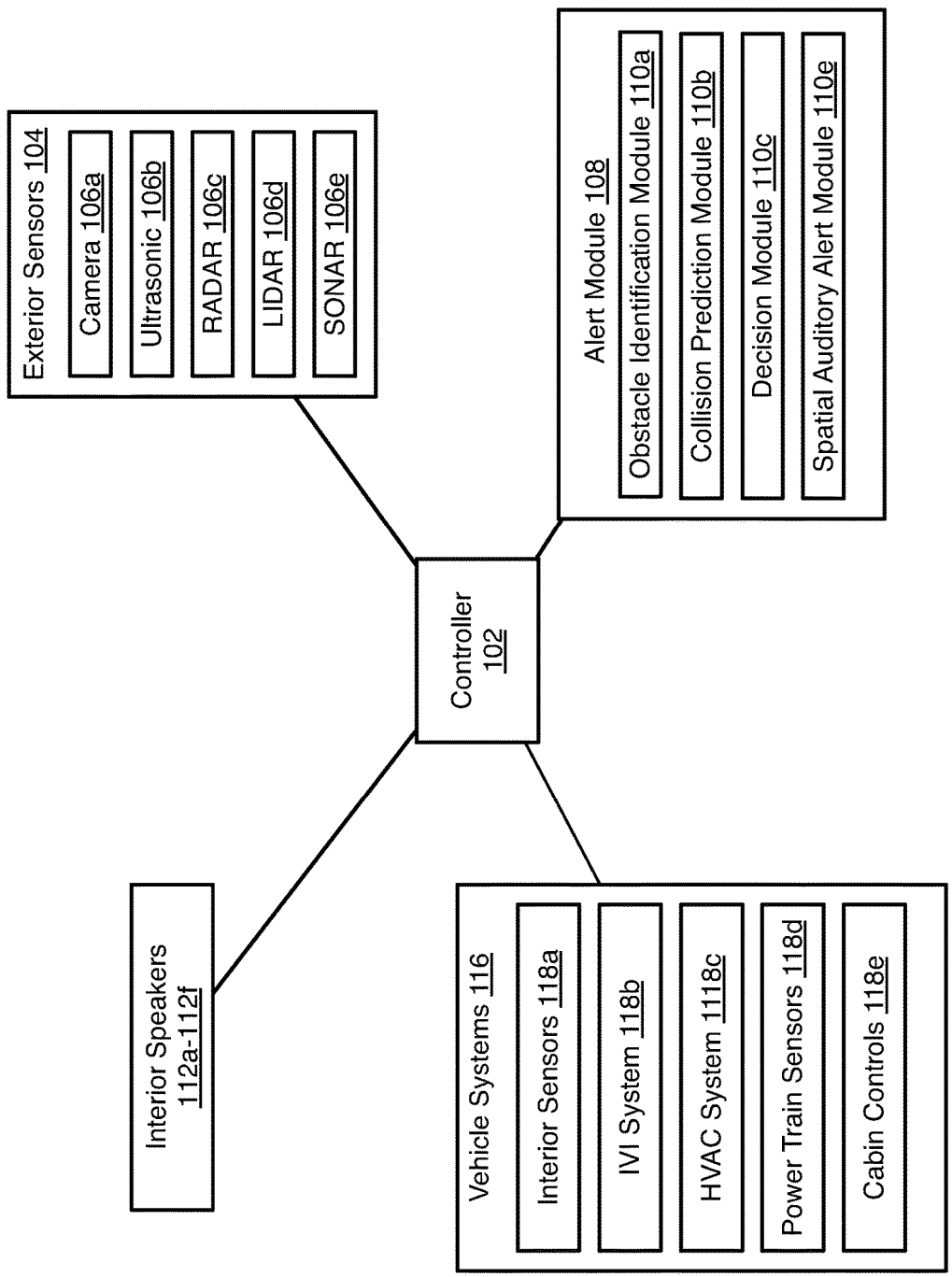
FIG. 1A is a schematic block diagram of components of a vehicle for implementing methods in accordance with an embodiment of the present invention.
Figure 1B:
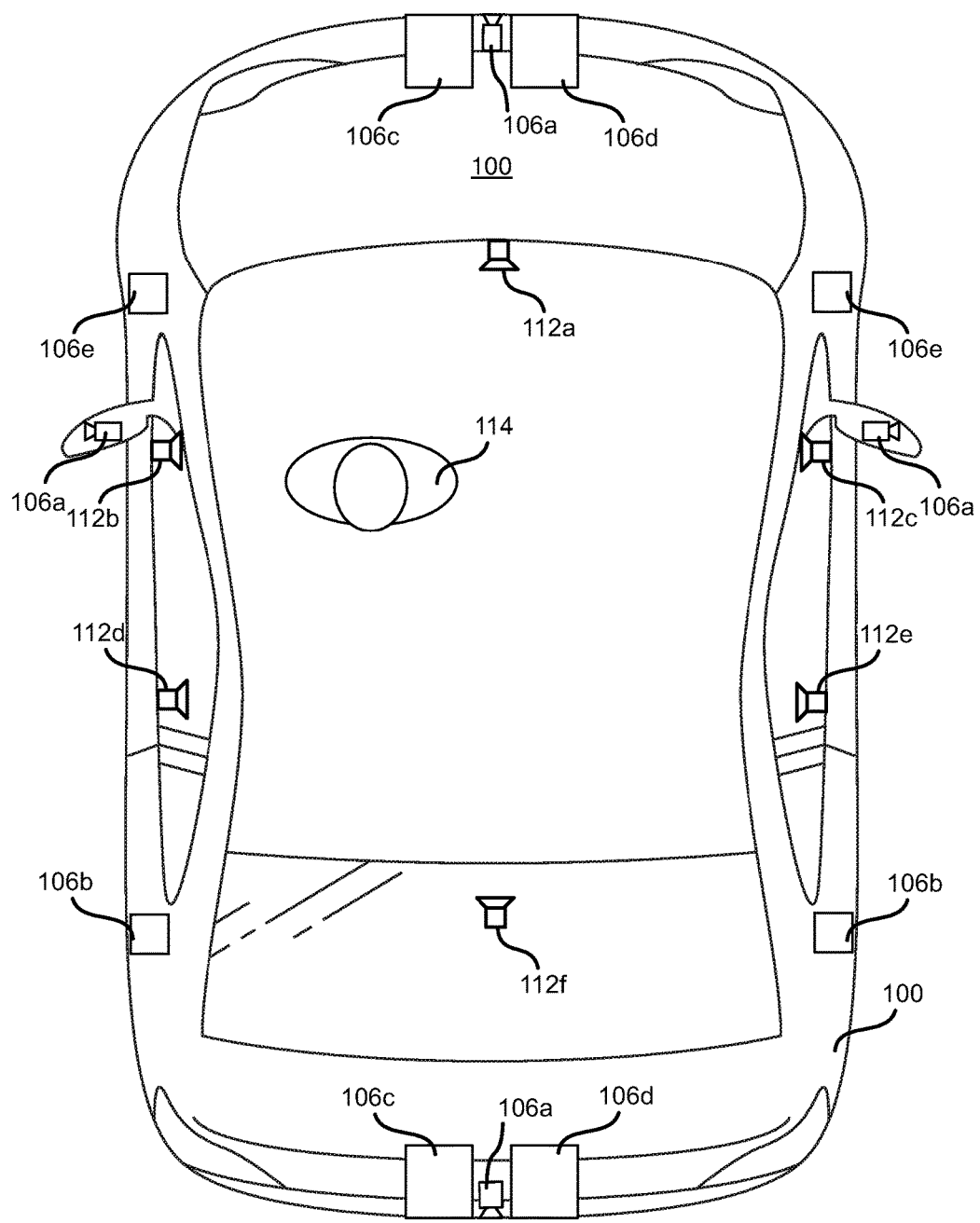
FIG. 1B is a schematic diagram of a vehicle including an array of interior speakers and exterior sensors.

Referring to FIGS. 1A and 1B, a vehicle 100 may include any vehicle known in the art. The vehicle 100 may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, a controller 102 may receive one or more outputs from one or more exterior sensors 104. For example, one or more cameras 106a may be mounted to the vehicle 100 and output image streams received to the controller 102.

The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

As shown in FIG. 1B, the exterior sensors 104 may be distributed around the vehicle 100 such that substantially 360 degrees (e.g. within 10 degrees) surrounding the vehicle 100 is in the field of view of at least one of the exterior sensor 104. The type and placement of the various types of sensors 106a-106e as shown in FIG. 1B is exemplary only. Any other placement of sensors 106a-106c sufficient to enable sensing of the vehicle's 100 surroundings may be used.

The controller 102 may execute an alert module 108 that receives the outputs of the exterior sensors 104. The alert module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in vehicle signals derived from the sensors.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision whether to generate an alert based on a detected obstacle or other criteria, such as departure from the vehicle's 100 lane or other unsafe condition.

In some embodiments, the decision module 110c may be part of an autonomous vehicle, in which case the decision module 110c may automatically determine whether to stop, accelerate, turn, etc., in order to avoid obstacles. The manner in which the collision prediction module 110b predicts potential collisions and the manner in which the decision module 110c takes action to avoid potential collisions may be according to any method or system known in the art of autonomous vehicles.

The alert module 108 may include a spatial auditory alert module 110e. The spatial auditory alert module 110e causes interior speakers 112a-112f to generate alerts simulating sound emanating from a location corresponding to a basis for the alert, such as the location of an obstacle detected using exterior sensors 104. The speakers 112a-112f are distributed around a driver 114 such that by adjusting the timing and phase of signals played back by the speakers 112a-112f, the driver 114 perceives sound emanating from a particular simulated location.

The manner in which these spatial auditory alerts are generated based on outputs of the exterior sensors 104 is described below with respect to FIGS. 3 through 5B. In some embodiments, spatial auditory alerts may also be generated by the alert module 110e in response to the state of one or more vehicle system 116, such as outputs of interior sensors 118*a*, such as door sensors, which is illustrated below in FIG. 5C.

Figure 2:
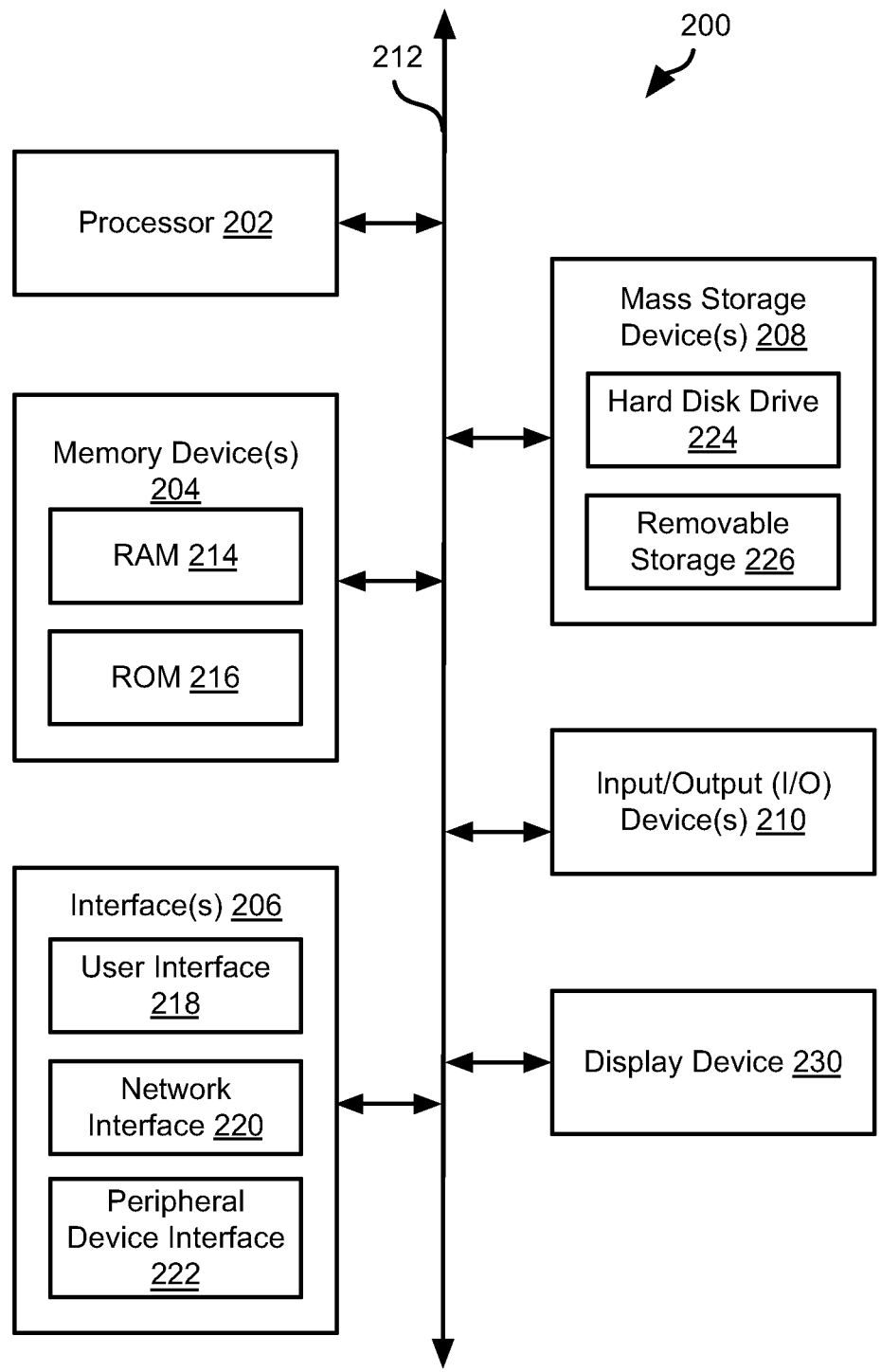
FIG. 2 is a schematic diagram of a computing devices for implementing the methods disclosed herein.

In a modern vehicle, nearly every interaction between passengers and vehicle is transmitted via a vehicle network as a signal. Any and all of these signals could be used as the basis for a spatial auditory signal according to the methods disclosed herein. In particular, each signal may be used to create a sound object (see element 304, FIG. 3). This could include any sort of button press or interaction with vehicle, such as window switch up and down, or HVAC controls, selectable drive modes, gear position. This could also include information that the infotainment system is trying to communicate such as incoming call signals, music signals (stereo signals could be represented by two objects), notifications, etc. Accordingly, the controller 102 may be coupled to the vehicle network and can receive and create sound objects for any information on the vehicle network. For example, sound objects may be created for signals to and/or from an IVI (in-vehicle infotainment) system 118*b*, HVAC (heating, ventilating, and air conditioning) system 118*c*, power train (engine, transmission, brakes, etc.) sensors 118*d*, and one or more cabin controls (power windows, power seat, etc.). FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
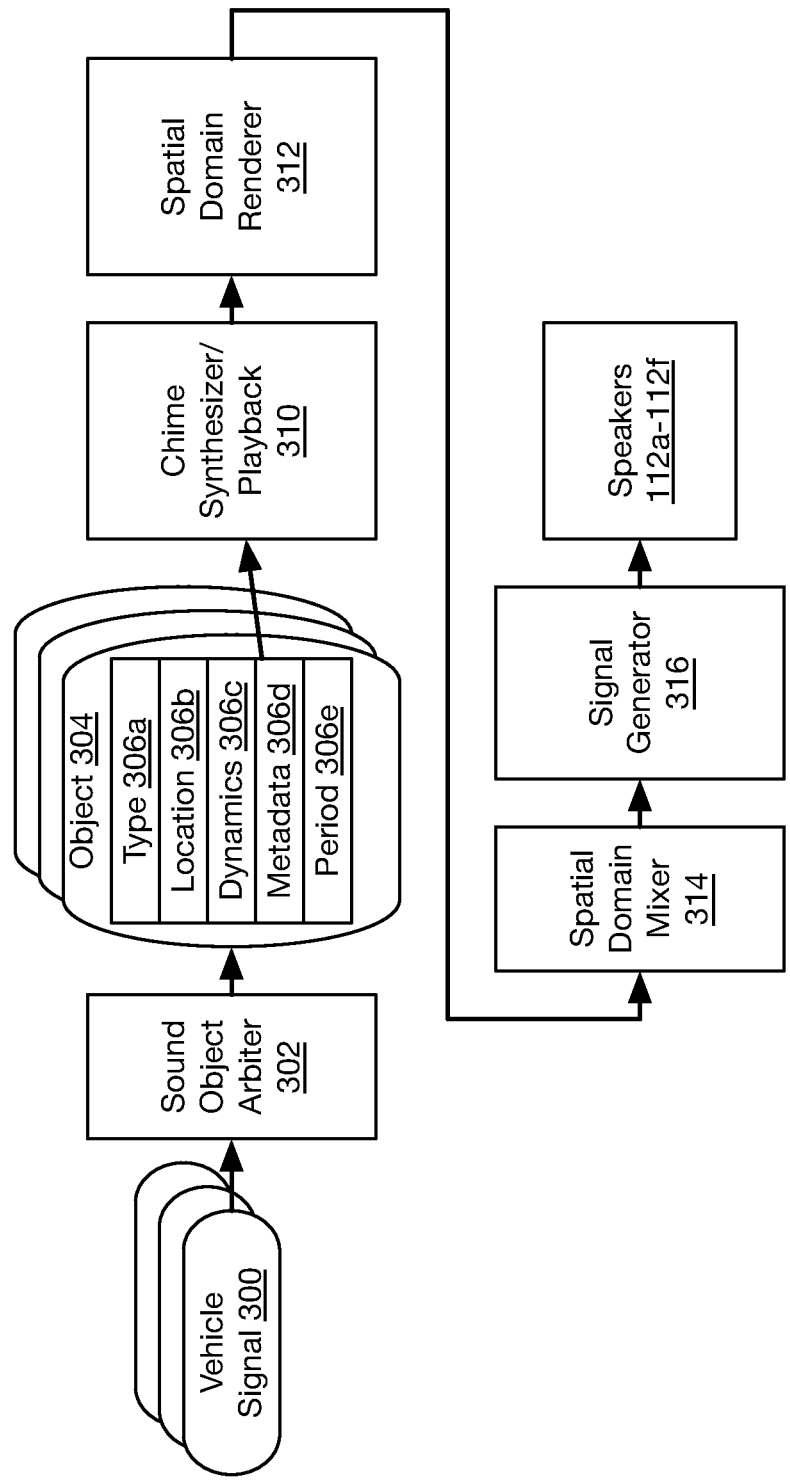
FIG. 3 is a flow diagram illustrating the process of sensor signals to generate spatial auditory alerts in accordance with an embodiment of the present invention.

Referring to FIG. 3, the controller 102 may implement the illustrated components and data flow. Vehicle signals 300 may be input to an alert object arbiter 302. The alert object arbiter 302 evaluates the sensor signals 300 to determine whether an alertable condition is indicated by one or more of the sensor signals. For example, the alert object arbiter 302 may perform the obstacle detection and collision prediction functions of the obstacle identification module 110*a*, collision prediction module 110*b*, and decision module 110*c*.

Where the decision module 110*c* indicates that collision with an obstacle is imminent, the alert object arbiter 302 may generate an object 304 representing the obstacle. The object 304 may be a software object. The object 304 may include such information as a type 306*a* of the object 304, which is a potential collision with the obstacle in this example. The type of obstacle may also be indicated by the type 306*a* (person, animal, vehicle, debris, structure, etc.).

The object 304 may further include a location 306*b*. For example, the sensor signal 300 may indicate the location as some or all of an angle, distance, a simple relative location (in front, behind, left, right), or a two or three dimensional coordinate relative to the vehicle 100. For example, each sensor 106*a*-106*e* has a field of view encompassing a known angular region around the vehicle. Accordingly, an obstacle detected by a sensor 106*a*-106*e* may be assumed to be in that angular region. Some of the sensors 106*a*-106*e*, may indicate a distance to the obstacle as well, particularly sensors 106*b*-106*e* or a cameras 106*a* implementing binocular vision. Other sensors provide outputs in the form of a point cloud of three-dimensional coordinates that indicate a location of an obstacle, specifically LIDAR sensors 106*d*.

The location 306*b* may be the same as the location output by the sensor 106*a*-106*e* in the output of which the obstacle was detected or may be translated version of the location indicated by vehicle signals derived from the sensor. For example, locations on the exterior of the vehicle may be mapped to a position within the interior of the vehicle 100.

The object 304 may further include dynamics 306*c* for the obstacle. Sensors 106*a*-106*e* may detect a velocity as well as location. Accordingly, this velocity may be stored in the dynamics 306c. The velocity stored in the dynamics 306c may be the same as that detected by the sensor 106a-106e or a translated version of this velocity. In some embodiments, velocity may be inferred from changes in location over time of the obstacle, i.e. by measuring the location of the obstacle at two points in time and dividing the change in location by the delay between the two points in time.

The object 304 may further include metadata 306d. The metadata 306d may define one or more parameters governing the generation of sound for the object 304 and may be defined by methods that take as inputs signals derived from sensors and/or other vehicle signals and output metadata values according to predefined functions.

For example, metadata 306d may include a sound volume selected according to a size or proximity of the obstacle, e.g. be larger with a decreasing distance to the location 306b. Other metadata may include whether the sound source of the object 304 should be modeled as a plane wave, point source, or other type of sound source defining spatial rendering. In some embodiments, the location 306b is an actual location of an obstacle or sensor corresponding to the object 304. In such embodiments, the metadata 306d may include a translated sound source obtained from a translation of the actual location according to some function.

The object 304 may further include a period 306e. In some embodiments, audio alerts may include a plurality of repeated tones with the period of repetition of the tones being dependent on properties of the vehicle signal that invoked creation of the object 304. For example, the period 306e may decrease with increasing velocity of the obstacle or decrease with decrease in a distance to the obstacle. The above examples of volume and period are exemplary only. As described in greater detail below, any "auditory dimension" of a chime may be controlled according to the metadata 306d.

Below is an example of attributes of a software object 304 that may be generated for a vehicle signal:
Object.Name=(e.g., Tracked Pedestrian #3)
Object.Class=(e.g., media, alert, safety, button click, navigation)
Object.Class.Subtype=(e.g., phone call, pedestrian, stereoL/R channel, window button press/release)
Object.Class.Subtype.(otherdata) (Could be length of time button is pressed or any other data that could be used to define the sound. Or could be a note that the pedestrian hasn't made eye contact with the vehicle and the car doesn't think the pedestrian has acknowledged the presence of the vehicle.)
Object.RelativePosition=<x,y,z> vector
Object.Velocity=<x,y,z> vector
Object.RangeRate=scalar (e.g., closing rates for ADAS calculations)
Object.Precedence=(defines sound priority, which is important for safety and sound ducking)
Sound Metadata Based on Vehicle Metadata, Dynamically Created for Signals:
Object.sound.SourceType=(e.g., point source, plane wave—defines type of spatial rendering)
Object.sound.RelativeVolume=(e.g., −0.0 dB)
Object.sound.SourcePosition=<x,y,z> vector (e.g., source position in virtual acoustic space maybe not be the same as real space, but they are directly correlated through a method)

In some instances, a vehicle signal 300 may correspond to pre-existing object 304 or the same obstacle as another sensor signal 300. Accordingly, the alert object arbiter 302 may ensure that the object 304 corresponding to the sensor signal 300 is updated accordingly. For example, if a sensor signal 300 indicates an obstacle is present at a current location, the alert object arbiter 302 may determine whether there exists an object 304 having a location 306b within some threshold of the current location and, if so, the location 306b may be updated to the current location. Alternatively, the current location may be compared to projected locations for the pre-existing objects 304 based on the location 306b plus the product of a relative velocity in the dynamics 306c and an elapsed time since the location 306b was last updated. If the current location is within some threshold of the projected location, then the location 306b and/or dynamics 306c may be updated based on the sensor signal 300.

In other instances, an object 304 may be created by the alert object arbiter 302 for other vehicle signals. In one example, if a door is detected by an interior sensor 118a to be ajar, an object 304 may be created having as the location 306a the location of the door indicated to be ajar by the interior sensor 118a. The type 306a may be a "door ajar" type. As described below, the movement of a simulated source of sound may be simulated toward the door that is found to be ajar. Accordingly, the location 306a may be updated over a time period according to this desired movement. The simulated movement may be defined by arbitrarily defined dynamics 306c of the object 304. Likewise, the volume 306d and period 306e may be set or progressively modified according to a programmatic sequence in order to provide a spatial auditory signal that clearly indicates that a door is a jar and its location.

A seat belt sensor signal may also result in a similar object 304 that indicates the location of the seat belt that is unfastened in the same manner described above. Other vehicle signals 300 may also result in corresponding objects 304 and have attributes 306a-506e that are set according to defaults in order to clearly indicate where the driver's attention should be directed and indicate the type of problem indicated by the vehicle signal.

A chime synthesizer/play back module 310 may select, generate, and/or play back chimes corresponding to one or more of the objects 304. The module 310 takes as inputs some or all of the data of the object 304. For example, metadata 306d of the object 304 may be used by the module 310 to select or synthesize a chime for the object 304. For example, a certain chime may be selected for objects 304 of a given type. In the case of obstacles, the chime selected may be selected based on a determined type of obstacle (pedestrian, animal vehicle, etc.) or behavior of the obstacle (rear cross-traffic obstacle, oncoming traffic obstacle, front cross-traffic obstacle, etc.).

In some embodiments, chimes may be played back as a series of chimes having attributes corresponding to the metadata 306d of the object 304. In one example, the volume and period of chimes may vary over time as an obstacle becomes closer or moves faster. Likewise, the volume and period may be modified according to a programmed logic for certain vehicle signals in a way that does not correspond to any actual movement of an obstacle, such as in the case of sensing a door to be ajar.

The chime synthesizer may therefore generate an audio signal that includes this series of chimes. The synthesizer may simply repeat an audio segment to obtain the series of chimes or synthesize the series of chimes based on parameters defining the chimes (frequency content, volume envelope, etc.) according to any sound synthesis technique known in the art.

In some cases, the chime may be a pre-programmed audio file that is simply retrieved by the playback module 310 rather than synthesized.

The output of the chime synthesizer and playback module 310 may be input into a spatial domain renderer 312. The spatial domain renderer 312 simulates propagation of sound within a 3D domain that is independent of the speaker configuration of the vehicle 100. In particular, the spatial domain renderer may render simulated sound emanating from the location 306b using a speaker-independent sound representation technique such as Ambisonics.

The spatial domain renderer 312 may do this for each object 304. The rendering of the chimes according to the spatial domain renderer 312 for the various objects 304 may then be combined in a spatial domain mixer 314. The output of the spatial domain mixer 314 is then input to a signal generator 316 that generates signals that are input to the speakers 112a-112f.

The function of the spatial domain renderer 312, spatial domain mixer 314, and signal generator 316 may include or be replaced by any three-dimensional audio rendering scheme known in the art. In particular, any technique known in the art for simulating origin of a sound from a particular location by controlling the signals supplied to an array of speakers may be used. In particular, any of the following techniques or their equivalents may be used:

MPEG-H 3D Audio (direct rendering in audio channels, as audio objects, or higher order Ambisonics (HOA)) (MPEG=Moving Picture Experts Group).

MPEG Surround

Dolby Surround 7.1

Direct spatial rendering and playback in N-channel PCM (pulse code modulation) files using Wave Field Synthesis, DBAP (Distance Base Amplitude Panning), or Ambisonics equivalent panning.

As known in the art, these techniques produce audio signals that cause the listener to infer a desired location and distance to a source of sound based on perceived interaural level difference (ILD), interaural time difference (ITD), interaural coherence (IC).

Figure 4:
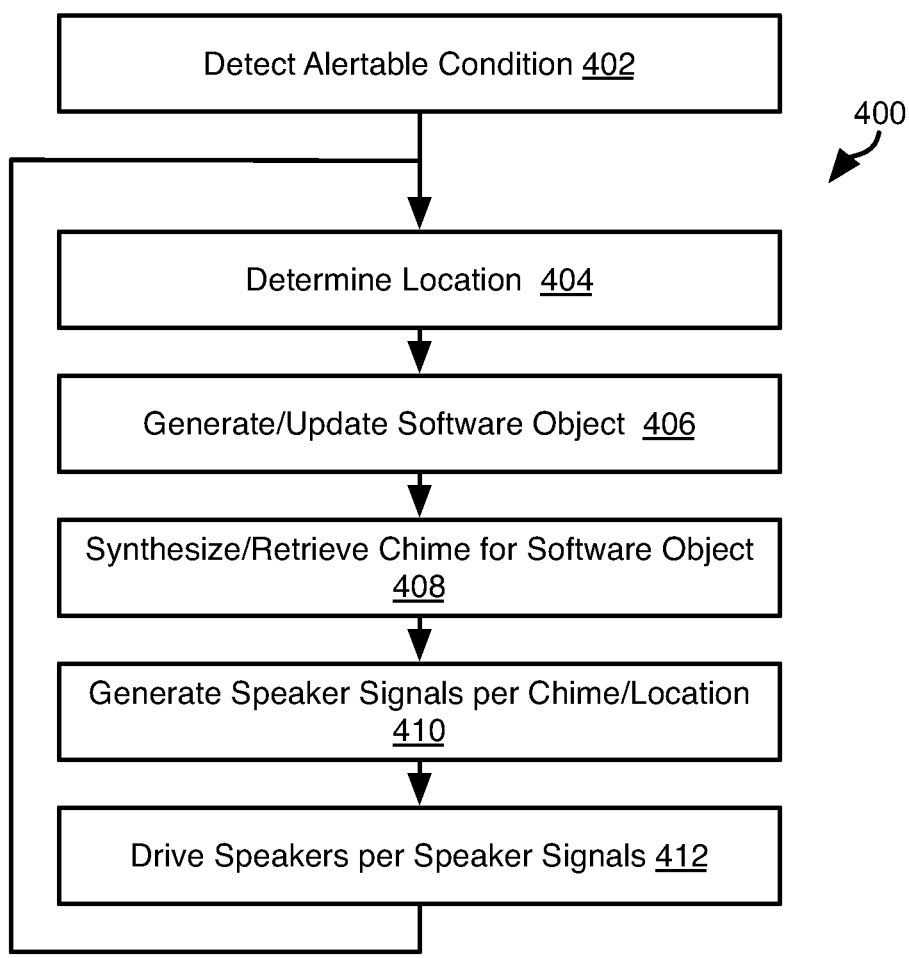
FIG. 4 is a process flow diagram of a method for generating spatial auditory alert in accordance with an embodiment of the present invention.

Referring to FIG. 4, the controller 102 may execute the illustrated method 400. The method 400 may include detecting 402 an alertable condition. This may include detecting an obstacle, pedestrian, bicycle, vehicle, rear cross traffic, lane departure, blind spot occupancy, a door ajar, traffic light or any other condition that may require a notification to the driver. Detecting the alertable condition may include detecting the error condition based on sensor signals 300 as described hereinabove.

The method 400 may include determining 404 a location of the error condition. Where the error condition inherently has a location associated therewith, as is the case of an exterior feature such as an obstacle, lane marking, traffic light, pedestrian, vehicle, rear cross-traffic, lane departure, and blind spot occupancy, the location determined at step 404 may be the same as this location or a transformation of this location. In the case of lane departure, the location may be a simulated location to the side of the driver 114 corresponding to the direction of lane departure.

In the case where movement of a sound source is simulated, such as in the case of simulated movement of a sound source toward a door that is ajar, determining 404 the location may include determining a next location according to a parameters defining the simulated movement.

The method 400 may further include generating 406 a software object 304 representing the alertable condition for the first execution of step 406 or updating 406 a software object for subsequent executions for the same alertable condition. As noted above, where an obstacle is detected, step 406 may be executed repeatedly such that the location 306b of the software object representing the obstacle is updated to track movement of the obstacle relative to the vehicle 100 as such movement is indicated in the output of one or more sensors 106a-106e. As noted above, this may include sensing an obstacle in the output of one or more sensors 106a-106e and identifying a software object 304 having a location 306b or predicted location within a threshold distance of the current location of the obstacle. This software object 304 may then be updated 406 to include the current location 306b of the obstacle. The dynamics 306c may also be updated 306 according to change in the location of the obstacle and/or a directly detected velocity of the obstacle.

The method 400 may further include synthesizing or retrieving 408 from a database a chime for each software object 304. Synthesizing may include generating a segment of audio having a frequency composition, amplitude envelope, or other attributes. These attributes may correspond to the attributes of the software object. As noted above, synthesizing the chime may include synthesizing a series of segments where the volume of each segment and/or period of the segments corresponds to an inverse of the distance to the obstacle, a relative velocity of the obstacle, or other property of the obstacle.

Where movement of a sound source is simulated, the volume and period between segments may be selected to according to this simulated movement, e.g. volume may increase and the period may decrease with decreasing distance between the simulated location of the sound source and the driver.

The above examples of attributes of a chime are only exemplary. Any "auditory dimensions" of the chime may be controlled in order to make a chime distinct and to communicate information to the driver. An auditory dimension is typically defined as the subjective perceptual experience of a particular physical characteristic of an auditory stimulus. So, for example, a primary physical characteristic of a tone is its fundamental frequency (usually measured in cycles per second or Hz). The perceptual dimension that corresponds principally to the physical dimension of frequency is "pitch", or the apparent "highness" or "lowness" of a tone. Likewise the physical intensity of a sound (or its amplitude) is the primary determinant of the auditory dimension "loudness." Accordingly, a chime synthesized at step 408 may include monoaural signal having any combination of auditory dimensions such as pitch, loudness, timbre, spatial location (the 3d position of sound relative to listener), spectral grouping, rhythm and speed of repetition. As noted above, the auditory dimensions may be selected as a function of the metadata 306d of the software object 304.

The method 400 may further include generating 410 speaker signals according to the chime synthesized at step 408 and the location of step 404. As noted above, this location 404 may very over time to simulate movement of a source of the chime. In some embodiments, the software objects 304 including the chime and location (static or time varying) may be input to any technique known in the art for simulating the generation of sound from a location using an array of speakers. Accordingly, step 410 may include processing the software objects according to any of the three-dimensional auditory rendering scheme listed above.

The speakers 112a-112f may then be driven according to the signals generated at step 412. Steps 404-412 may be repeated throughout the lifetime of a software object, i.e.

until the alertable condition of step 402 is no longer detected, such as an obstacle no longer being on a collision course with the vehicle 100, rear cross-traffic no longer being detected, lane departure no longer occurring, a blind spot no longer being occupied, or a door no longer being ajar.

Figure 5A:
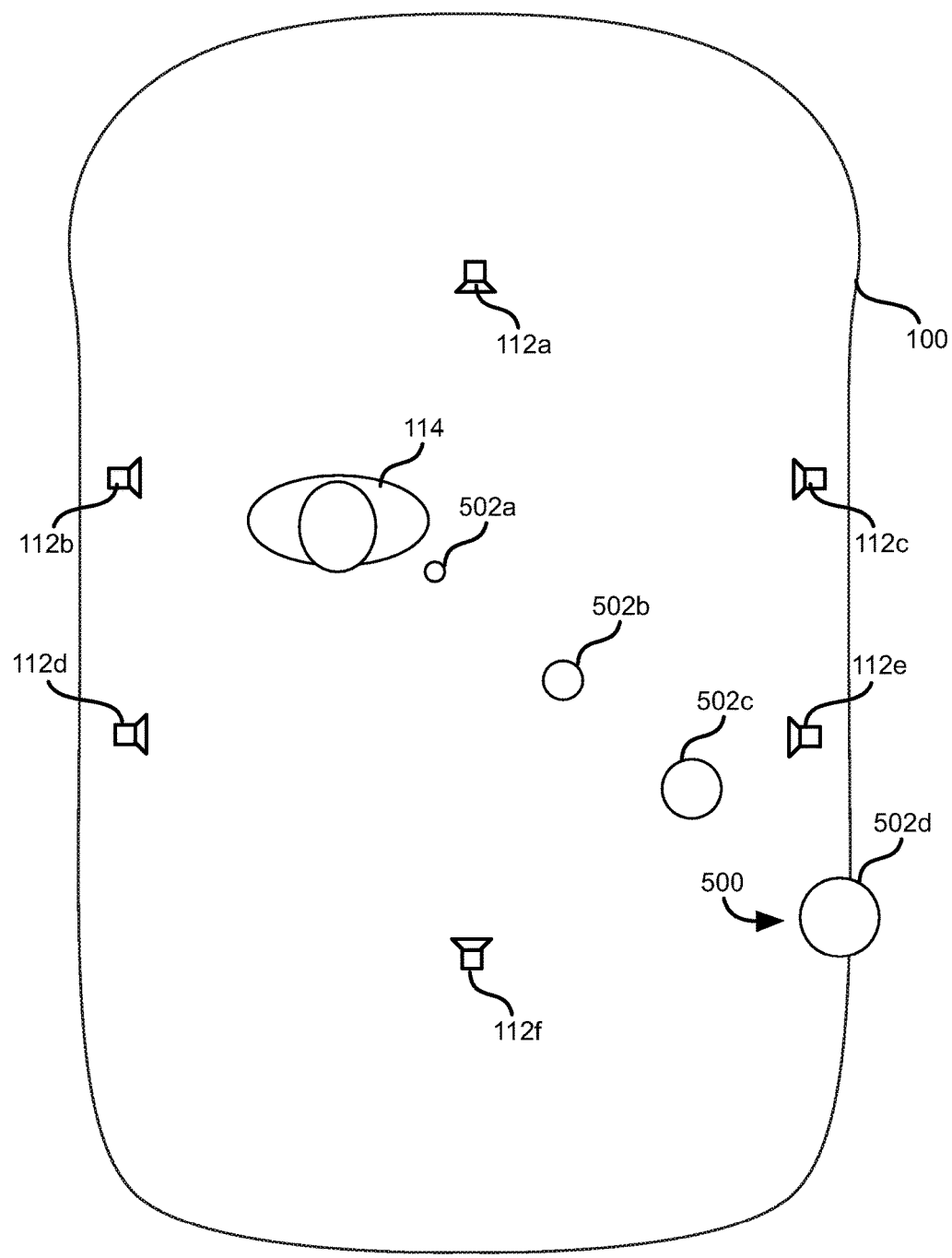
FIGS. 5A to 5C are diagrams illustrating generation of spatial auditory alerts for various signals in accordance with an embodiment of the present invention.
Figure 5B:
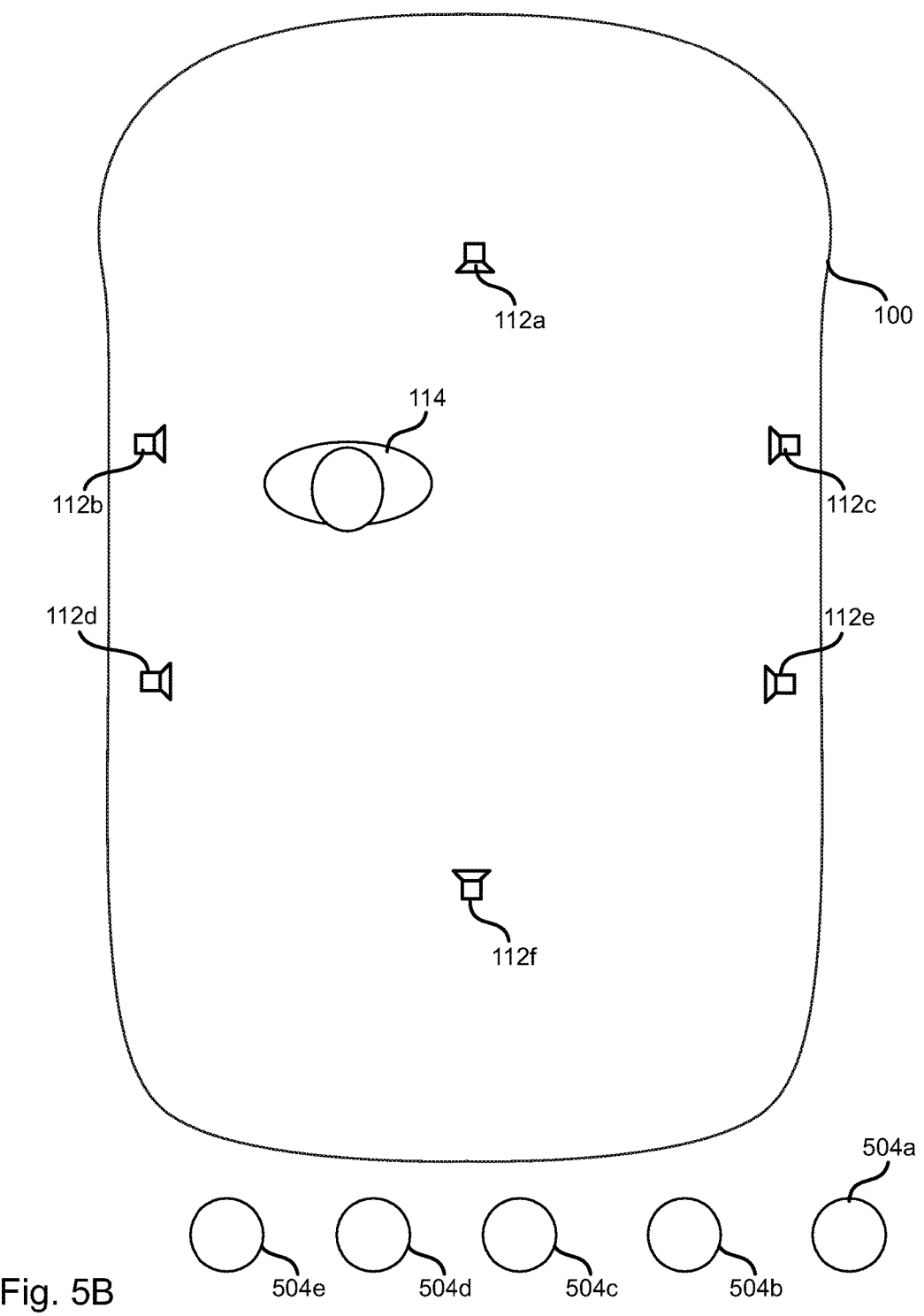
Figure 5C:
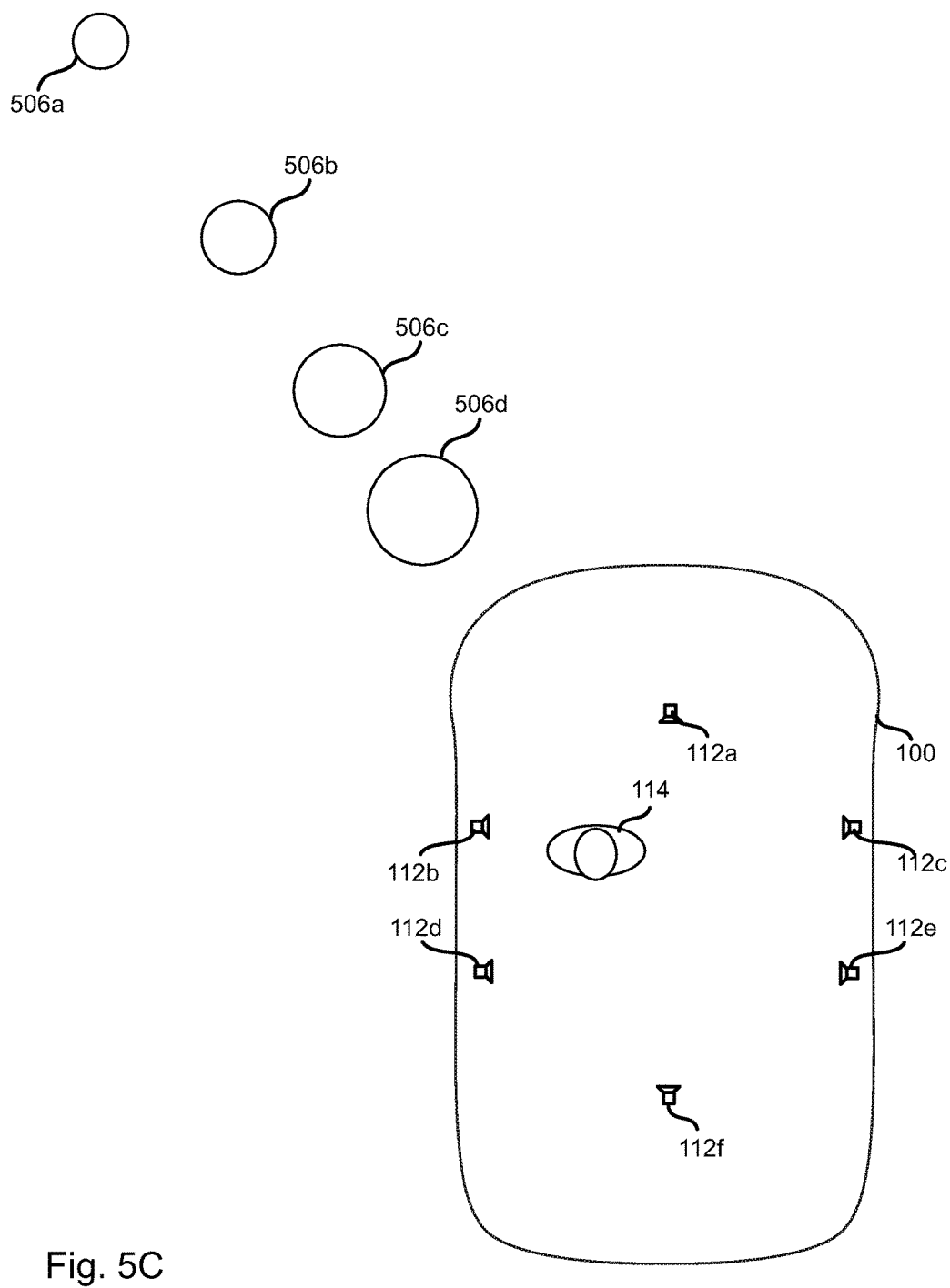

FIGS. 5A to 5C illustrate example scenarios in which the method 400 may be executed. Referring specifically to FIG. 5A, a door sensor at position 500 produces an output indicating that the door sensed by the door sensor is not properly closed. In response, the controller generates a series of chimes having simulated locations indicated by circles 502a-502d. In particular, the location of each circle 502a-502d represents a simulated origin of sound originating from the speakers 112a-112f As is apparent, over time the simulated locations 502a-502d progress from point 502a to point 502d thereby simulating movement toward the door that is ajar. The size of the circles 502a-502d indicate a volume of the chimes played at that location. Accordingly, the volume of the chimes may increase with movement away from the driver 114.

Note that in the embodiment of FIG. 5A, the chimes are shown moving with respect to the driver 114. Accordingly, in some embodiments, the location of the driver may be detected. For example, an interior LIDAR sensor may generate a point cloud of objects in the interior of the vehicle 100 and the driver's head may be identified from this point cloud.

Referring to FIG. 5B, in another scenario, one of the sensors 106a-106e detects rear cross traffic. In response, the controller 102 causes the generation of chimes by the speakers 112a-112f with simulated locations indicated by circles 504a-504e. As indicated, the locations of the chimes may move from 504a to 504e over time thereby giving an impression to the driver of traffic crossing behind the vehicle 100. Note that the cross traffic that gives rise to the chimes 504a-504e may not actually be behind the vehicle 100 at all whereas the locations of the chimes 504a-504e are in order to clearly communicate to the driver the potential danger before it occurs. However, in other embodiments, the locations of the chimes 504a-504e correspond to at least the direction to the cross traffic that is sensed.

As for other embodiments, the chimes 504a-504e may increase in volume with decreasing distance to the cross traffic. The chimes may further include segments repeated at a period that decreases with the decreasing distance to the cross traffic.

Referring to FIG. 5C, in another scenario, the circles 506a-506d indicate the simulated location of chimes corresponding to an obstacle likely to, or having the potential to, collide with the vehicle 100. The simulated locations 506a-506d may be the same as that of the obstacle or may be a transformed version. For example, to provide an early warning, the simulated locations 506a-506d may be closer than the actual locations of the obstacle. As indicated by the size of the circles 506a-506d, the volume of the chimes may increase with decreasing distance from the vehicle 100 to the obstacle. Likewise, each chime may be a series of audio segments having a period of the segments decreasing with the decreasing distance.

The examples of FIGS. 5A to 5C are merely exemplary. Any vehicle signal may be presented with a software object having a location and or movement simulated using the speakers 112a-112f according to the method disclosed above. For example a non-exhaustive list may include:

1) Adaptive cruise control, e.g. software objects indicating a need to slow or increase speed in order to avoid a collision.
2) Automatic Emergency Braking, e.g. software objects indicating that braking is being or has been invoked.
3) Automatic or Aided Parking, e.g. software objects indicating a direction to turn the steering wheel or a direction the vehicle should travel to execute a parking maneuver.
4) Blind Spot Detection, e.g. software objects indicating a location of an obstacle in a blind spot or the side on which the occupied blind spot is located.
5) Collision avoidance, e.g. software objects indicating a location and or direction of movement of an obstacle.
6) Lane Departure or Lane Keeping, e.g. software objects indicating the direction of lane departure or the direction that the vehicle should move to return to the proper lane.
7) GPS Navigation, e.g. software objects indicating a turn instruction or that the driver should proceed straight.
8) Tire Pressure Monitoring, e.g. software objects indicating a location of the tire that has low pressure.
9) Limits of tire traction sensing and alerting, e.g. software objects indicating the accelerator should be lifted, brakes should be applied, or that a turn should be less sharp.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a controller of a vehicle:
   receiving sensor data from multiple vehicle sensors;
   generating software objects corresponding to the sensor data;
   modifying the software objects in real time based on updated data from the vehicle sensors; and
   generating three dimensional (3D) auditory signals using a plurality of speakers according to the software objects to convey vehicle information to a driver;
   wherein generating the software objects corresponding to the sensor data comprises:
   detecting, in the sensor data, presence of an exterior feature and a feature location for the exterior feature; and
   creating a feature software object for the exterior feature and having the feature location associated therewith; and
   wherein modifying the software objects in real time based on the updated data from the vehicle sensors comprises:
   detecting movement of the exterior feature relative to the vehicle in the updated data to an updated location; and
   modifying the feature location according to the updated location in the feature software object.

2. The method of claim 1, wherein generating the 3D auditory signals using the plurality of speakers according to the software objects comprises:
   generating a feature audio signal having a simulated location in outputs of the plurality of speakers corresponding to the feature location of the feature software object.

3. The method of claim 2, wherein the vehicle sensors comprise at least one of an ultrasonic sensor, a radio detection and ranging (RADAR) sensor, a light detection and ranging (LIDAR) sensor, a camera, and a sound navigation and ranging (SONAR) sensor.

4. The method of claim 2, wherein generating the 3D auditory signals using the plurality of speakers according to the software objects comprises:
generating a series of audible sounds having a separation between audible sounds that decreases with decrease in a distance between the feature location and the vehicle.

5. The method of claim 2, wherein generating the 3D auditory signals using the plurality of speakers according to the software objects comprises:
generating a series of audible sounds having one or more auditory dimensions effective to convey at least one of a location of the exterior feature relative to the vehicle, a type of exterior feature, the relative threat level of the exterior feature, a distance between the vehicle and the exterior feature, and a rate of change of the distance.

6. The method of claim 1, wherein receiving sensor data from multiple vehicle sensors comprises receiving an output of a door sensor indicating that a door is ajar, the method further comprising:
generating a door ajar software object having a location associated therewith and varying the location associated with the door ajar software object over a time period to indicate movement toward the door; and
generating the three dimensional (3D) auditory signals using the plurality of speakers over the time period according to a current value of the location.

7. The method of claim 1, wherein receiving sensor data from multiple vehicle sensors comprises receiving signals used by the controller for implementing one or more of:
adaptive cruise control;
automatic emergency braking;
automatic parking;
assisted parking;
blind spot detection;
collision avoidance;
lane departure warning;
lane keeping assistance;
global positioning system (GPS) navigation;
tire pressure monitoring; and
a traction control system.

8. A vehicle comprising:
a plurality of sensors operable to sense operating parameters of the vehicle;
a plurality of speakers positioned within an interior of the vehicle;
a controller operably coupled to the plurality of sensors and the plurality of speakers, the controller programmed to:
receive sensor data from the plurality of sensors;
generate software objects corresponding to the sensor data;
modify the software objects in real time based on updated data from the plurality of sensors; and
generate three dimensional (3D) auditory signals using a plurality of speakers according to the software objects to convey vehicle information to a driver;
wherein the controller is further programmed to generate software objects corresponding to the sensor data by:
detecting, in the sensor data, presence of an exterior feature and a feature location for the feature; and
creating a feature software object for the exterior feature and having the feature location associated therewith; and wherein the controller is further programmed to modify the software objects in real time based on the updated data from the plurality of sensors by:
detecting movement of the exterior feature relative to the vehicle in the updated data to an updated location; and
modifying the feature location according to the updated location in the feature software object.

9. The vehicle of claim 8, wherein the controller is further programmed to generate the 3D auditory signals using the plurality of speakers according to the software objects by:
generating a feature audio signal having a simulated location in outputs of the plurality of speakers corresponding to the feature location of the feature software object.

10. The vehicle of claim 9, wherein the plurality of sensors comprises at least one of an ultrasonic sensor, a radio detection and ranging (RADAR) sensor, a light detection and ranging (LIDAR) sensor, a camera, and a sound navigation and ranging (SONAR) sensor.

11. The vehicle of claim 9, wherein the controller is further programmed to generate the 3D auditory signals using the plurality of speakers according to the software objects by:
generating a series of audible sounds having a separation between audible sounds that decreases with decrease in a distance between the feature location and the vehicle.

12. The vehicle of claim 9, wherein the controller is further programmed to generate the 3D auditory signals using the plurality of speakers according to the software objects by:
generating a series of audible sounds, the intensity of the audible sounds increasing with decrease in a distance between the feature location and the vehicle.

13. The vehicle of claim 8, wherein the controller is further programmed to:
receive sensor data from the plurality of sensors by receiving an output of a door sensor indicating that a door is ajar;
generate a door ajar software object having a location associated therewith and varying the location associated with the door ajar software object over a time period to indicate movement toward the door; and
generate the three dimensional (3D) auditory signals using the plurality of speakers over the time period according to a current value of the location.

14. The vehicle of claim 8, wherein the controller is further programmed to receive sensor data from multiple vehicle sensors comprises receiving signals used by the controller for implementing one or more of:
adaptive cruise control;
automatic emergency braking;
automatic parking;
assisted parking;
blind spot detection;
collision avoidance;
lane departure warning;
lane keeping assistance;
global positioning system (GPS) navigation;
tire pressure monitoring; and
a traction control system.

* * * * *